United States Patent
Yang et al.

(10) Patent No.: US 10,635,221 B2
(45) Date of Patent: Apr. 28, 2020

(54) ARRAY SUBSTRATE, IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/395,687

(22) PCT Filed: Dec. 16, 2013

(86) PCT No.: PCT/CN2013/089479
§ 371 (c)(1),
(2) Date: Oct. 20, 2014

(87) PCT Pub. No.: WO2015/010421
PCT Pub. Date: Jan. 29, 2015

(65) Prior Publication Data
US 2016/0259460 A1 Sep. 8, 2016

(30) Foreign Application Priority Data
Jul. 26, 2013 (CN) .......................... 2013 1 0320139

(51) Int. Cl.
*G06F 3/041* (2006.01)
*G09G 3/36* (2006.01)
(Continued)

(52) U.S. Cl.
CPC ........ *G06F 3/0416* (2013.01); *G02F 1/13338* (2013.01); *G02F 1/136209* (2013.01);
(Continued)

(58) Field of Classification Search
CPC .. G09G 3/3677; G09G 3/3688; G06F 3/0416; G06F 3/0412; G06F 3/044;
(Continued)

(56) References Cited

U.S. PATENT DOCUMENTS 6,060,756 A * 5/2000 Machida ................. G01B 7/004
257/414
8,687,161 B2 * 4/2014 Kasahara ............ H01L 27/1214
257/202
(Continued)

FOREIGN PATENT DOCUMENTS

CN 1800917 A 7/2006
CN 102937853 A 2/2013
(Continued)

OTHER PUBLICATIONS

Dictionary.com, "adjacent," in Dictionary.com Unabridged. Source location: Random House, Inc. http://dictionary.reference.com/browse/adjacet, Nov. 18, 2011, p. 1.*
(Continued)

*Primary Examiner* — Stephen G Sherman (57) ABSTRACT

An array substrate includes: a plurality of sub-pixel units arranged in an array, in which every two adjacent rows of the sub-pixel units form one sub-pixel-unit group, and two gate lines that are configured to respectively provide gate signals for the two rows of the sub-pixel units are disposed between the two rows of the sub-pixel units; a plurality of touch driving electrodes, disposed between the sub-pixel-unit groups that are provided on the array substrate, and arranged in a row direction of the sub-pixel units; and a plurality of
(Continued)

touch sensing electrodes, disposed on the array substrate, arranged in a column direction of the sub-pixel units, and insulated from the touch driving electrodes and the gate lines.

17 Claims, 10 Drawing Sheets

(51) Int. Cl.
    *G02F 1/1333*     (2006.01)
    *G06F 3/044*     (2006.01)
    *G02F 1/1362*     (2006.01)

(52) U.S. Cl.
    CPC ........ *G02F 1/136286* (2013.01); *G06F 3/044* (2013.01); *G06F 3/0412* (2013.01); *G09G 3/3677* (2013.01); *G09G 3/3688* (2013.01); *G02F 2001/136222* (2013.01); *G06F 2203/04103* (2013.01); *G06F 2203/04111* (2013.01)

(58) Field of Classification Search
    CPC . G06F 2203/04103; G06F 2203/04111; G02F 1/13338; G02F 1/136209; G02F 1/136286; G02F 2001/136222
    See application file for complete search history.

(56) References Cited

U.S. PATENT DOCUMENTS

| | | | | |
|---|---|---|---|---|
| 8,835,927 | B2* | 9/2014 | Chang | H01L 33/08 |
| | | | | 257/59 |
| 9,147,368 | B2* | 9/2015 | Kasahara | H01L 27/1214 |
| 2002/0089493 | A1* | 7/2002 | Hong | G06F 3/041 |
| | | | | 345/173 |
| 2004/0150629 | A1* | 8/2004 | Lee | G06F 3/041 |
| | | | | 345/173 |
| 2005/0162410 | A1* | 7/2005 | Johnson | G06F 3/044 |
| | | | | 345/174 |
| 2006/0146260 | A1 | 7/2006 | Lee | |
| 2006/0176266 | A1* | 8/2006 | Pak | G02F 1/13338 |
| | | | | 345/104 |
| 2007/0176905 | A1* | 8/2007 | Shih | G02F 1/13338 |
| | | | | 345/173 |
| 2008/0117181 | A1* | 5/2008 | Park | G06F 3/0412 |
| | | | | 345/173 |
| 2008/0158199 | A1* | 7/2008 | Lee | G02F 1/13338 |
| | | | | 345/174 |
| 2009/0002336 | A1* | 1/2009 | Choi | G06F 3/044 |
| | | | | 345/174 |
| 2010/0060600 | A1 | 3/2010 | Wang et al. | |
| 2011/0102360 | A1* | 5/2011 | Chen | G06F 3/0412 |
| | | | | 345/173 |
| 2011/0310035 | A1* | 12/2011 | Kim | G06F 3/044 |
| | | | | 345/173 |
| 2012/0086665 | A1* | 4/2012 | Song | G02F 1/13338 |
| | | | | 345/174 |
| 2014/0104510 | A1 | 4/2014 | Wang et al. | |

FOREIGN PATENT DOCUMENTS

| | | |
|---|---|---|
| CN | 102945106 A | 2/2013 |
| CN | 102955635 A | 3/2013 |
| CN | 202838291 U | 3/2013 |
| CN | 103412675 A | 11/2013 |
| CN | 203366281 U | 12/2013 |

OTHER PUBLICATIONS

International Search Report dated Jul. 4, 2014; PCT/CN2013/089479.

Written Opinion of the International Searching Authority dated Apr. 23, 2014; PCT/CN2013/089479.

First Chinese Office Action Appln. No. 201310320139.X; dated Dec. 2, 2015.

Second Chinese Office Action Appl. No. 201310320139.X; dated Jan. 27, 2016.

* cited by examiner

ARRAY SUBSTRATE, IN-CELL TOUCH PANEL AND DISPLAY DEVICE

TECHNICAL FIELD

Embodiments of the present invention relate to an array substrate, an in-cell touch panel and a display device.

BACKGROUND

Touch panels (TP) comprise add-on touch panels and in-cell touch panels. An in-cell touch panel is a touch panel with touch driving electrodes and touch sensing electrodes integrated inside a liquid crystal display panel. Such touch panels have gradually become the mainstream of the touch display field due to their advantages of simple structure, high display performance, low costs and so on.

At present, liquid crystal display panels, according to the display mode, can be classified into at least: twisted-nematic (TN) type, in-plane switching (IPS) type, advanced-super dimension switch (ADS) type, and so on. An ADS type liquid crystal display panel achieves the image display in the way that a multi-dimensional electric field is formed by an electric field generated at edges of electrodes that are in a same plane and an electric field generated between an electrode layer and a plate-like electrode layer, so that all the liquid crystal molecules between electrodes and over the electrodes rotate. Compared with an IPS type liquid crystal display panel, an ADS type liquid crystal display panel can increase the work efficiency of liquid crystal and improve transmittance. An ADS type liquid crystal display panel is advantageous due to high picture quality, high resolution ratio, high transmittance, low power consumption, wide viewing angle, high aperture ratio, low color difference, free of push mura, and so on.

A liquid crystal display panel mainly comprises a color filer substrate, an array substrate and a liquid crystal layer disposed between the color filer substrate and the array substrate. With respect to one touch panel, touch sensing electrodes are disposed on a color filer substrate, and touch driving electrodes are disposed on an array substrate so as to achieve functions of in-cell touch and image display. In such an in-cell touch panel, the touch driving electrodes and the touch sensing electrodes are respectively disposed on the array substrate and the color filer substrate, so the structure of the touch panel is more complicated and the thickness is greater. In addition, the touch sensing electrodes on the color filer substrate and the touch driving electrodes on the array substrate, due to a far distance therebetween, are connected with two integrated circuit (IC) chips respectively to achieve an in-cell touch function. But, in practice, it is very hard to match the two IC chips.

SUMMARY

An embodiment of the present invention provides an array substrate, an in-cell touch panel and a display device, so as to achieve an in-cell touch panel with a simple structure.

One aspect of the present invention provides an array substrate, and the array substrate comprises: a plurality of sub-pixel units arranged in an array, in which every two adjacent rows of the sub-pixel units form one sub-pixel-unit group, and two gate lines that are configured to respectively provide gate signals for the two rows of the sub-pixel units are disposed between the two rows of the sub-pixel units; a plurality of touch driving electrodes, disposed between the sub-pixel-unit groups that are provided on the array substrate, and arranged in a row direction of the sub-pixel units; and a plurality of touch sensing electrodes, disposed on the array substrate, arranged in a column direction of the sub-pixel units, and insulated from the touch driving electrodes and the gate lines.

For example, the touch sensing electrodes are disposed above the touch driving electrodes, and the touch sensing electrodes act as common sub-electrodes that form common electrodes in a touch control period.

For example, a plurality of openings with a predetermined size is disposed in regions where each of the touch sensing electrodes overlaps the touch driving electrodes.

For example, the array substrate can further comprise metal lines disposed below each of the touch sensing electrodes and connected with the touch sensing electrodes by via holes. For example, the metal lines are disposed between the two gate lines in the sub-pixel-unit group.

For example, the array substrate can further comprise common electrode signal lines each disposed between two of the adjacent sub-pixel-unit groups, arranged in a row direction of the sub-pixel units, and connected with the respective common sub-electrodes by via holes. For example, the gate lines, the metal lines, the common electrode signal lines and the touch driving electrodes are disposed in a same layer. For example, the touch driving electrodes and the common electrode signal lines are disposed alternately.

For example, the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection Another aspect of the present invention provides an in-cell touch panel which comprises an opposite substrate and an array substrate that are disposed oppositely to each other, and a liquid crystal layer disposed between the opposite substrate and the array substrate; and the array substrate is any one of the above-mentioned array substrate.

For example, the opposite substrate comprises a color filer substrate.

A further aspect of the present invention provides a display device, and the display device comprises the above-mentioned in-cell touch panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

An embodiment of the present invention provides an array substrate, an in-cell touch panel and a display device, so as to achieve an in-cell touch panel with a simple structure.

The in-cell touch panel provided by an embodiment of the present invention can be a touch panel with touch driving electrodes and touch sensing electrode integrated in an advance-super dimension switch (ADS) type display panel. The in-cell touch panel provided by the embodiment of the present invention comprises a color filer substrate and an array substrate that are disposed opposite to each other, and a liquid crystal layer disposed between the color filer substrate and the array substrate; and touch driving electrodes and touch sensing electrodes are disposed on the array substrate. The array substrate provided by an embodiment of the present invention is an array substrate based on a dual-gate structure.

With reference to the accompanying drawings, the in-cell touch panel provided by the disclosure will be described in detail in the following, and an array substrate with a touch function will be mainly described.

Figure 1:
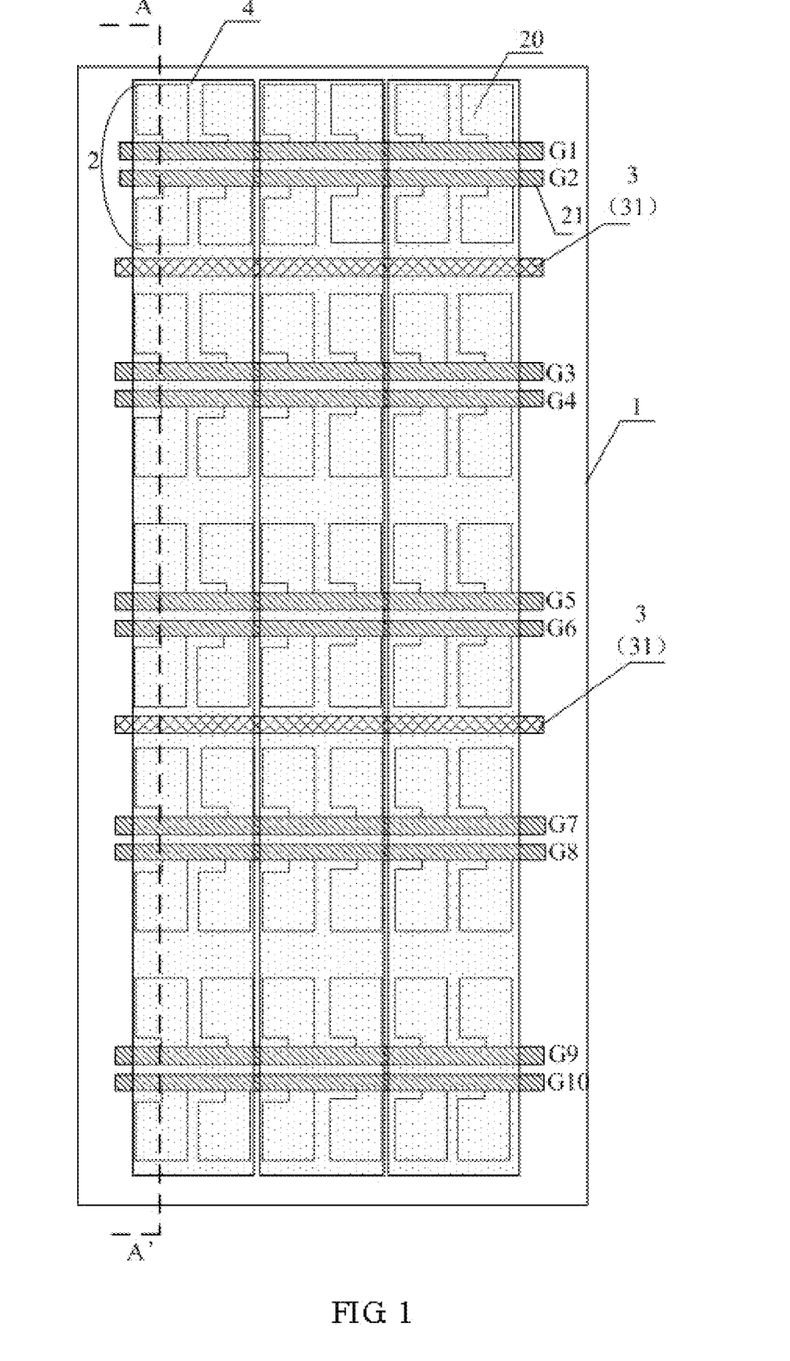
FIG. 1 is a top view schematically illustrating an array substrate provided by an embodiment of the present invention.

FIG. 1 is a top view schematically illustrating an array substrate provided by an embodiment of the present invention. As illustrated, the array substrate comprises: a base substrate 1; and a plurality of sub-pixel units 20 disposed on the base substrate 1 and arranged in an array. Two adjacent rows of the sub-pixel units 20 form a sub-pixel-unit group 2; two gate lines 21 are disposed between the two rows of the sub-pixel units 20 in a sub-pixel-unit group 2; and the two gate lines 21 provide the two rows of the sub-pixel units 20 with gate scanning signals respectively. The gate lines 21 illustrated in FIG. 1, from top to bottom, are sequentially G1, G2, G3, . . . , G9, and G10 . . . and so on. The array substrate further comprises: a plurality of touch driving electrodes 3 disposed between adjacent sub-pixel-unit groups 2 and arranged in the row direction of the sub-pixel units 20; and a plurality of touch sensing electrodes 4 arranged in the column direction of the sub-pixel units 20 and insulated from the touch driving electrodes 3 and the gate lines 21.

Figure 2:
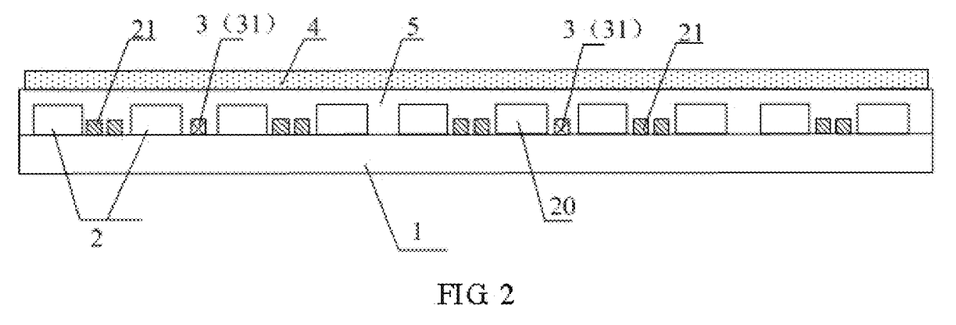
FIG. 2 is a cross-sectional view schematically illustrating the array substrate of FIG. 1 taken along direction A-A'.

In order to more clearly illustrate the relative position between the touch driving electrodes 3 and the touch sensing electrodes 4 in the embodiment as illustrated in FIG. 1, FIG. 2 presents a cross-sectional view schematically illustrating the array substrate of FIG. 1 taken along direction A-A'. The sub-pixel units 20, the gate lines 21, and the touch driving electrodes 3 are disposed on the base substrate 1; an insulating layer 5 is disposed on the sub-pixel units 20, the gate lines 21, and the touch driving electrodes 3, and the touch sensing electrodes 4 are disposed on the insulating layer 5; and FIG. 2 only illustrates two of the touch driving electrodes 3 and one of the touch sensing electrodes 4.

It is to be noted that, positions of the touch driving electrodes 3 and the touch sensing electrodes 4 of the embodiment is not limited to the arrangement as illustrated in FIG. 2, and positions of the two kinds of electrodes can be exchanged, namely, the electrodes indicated by reference sign 3 can be used as touch sensing electrodes, while the electrodes indicated by reference sign 4 can be used as touch driving electrodes. Preferably, the touch sensing electrodes 4 illustrated in FIG. 2 are disposed above the touch driving electrodes 3, in this way, the touch sensing electrodes 4 are closer to a person's finger, so the touch control effect is better.

The array substrate provided by the above-mentioned embodiment integrates the touch driving electrodes and the touch sensing electrodes that achieve the touch function. Such an arrangement can reduce the thickness of the entire in-cell touch panel on one hand, and help to integrate a driving IC for the touch driving electrodes and a sensing IC for the touch sensing electrodes within a same IC chip on the other hand, so the difficulty in matching the IC chips is decreased notably, the structure of the in-cell touch panel is simplified, and the competitiveness of products is improved.

The arrangement of the touch driving electrodes 3 provided by the embodiment comprise at least the following two ways.

The first way is illustrated as FIG. 1 or FIG. 2. Each of the touch driving electrodes 3 comprises one touch driving sub-electrode 31, namely, each touch driving sub-electrode 31 can be addressed separately. The touch driving sub-electrode 31(3) is disposed in a non-display region that is between the adjacent two rows of the sub-pixel-unit groups 2.

Figure 3:
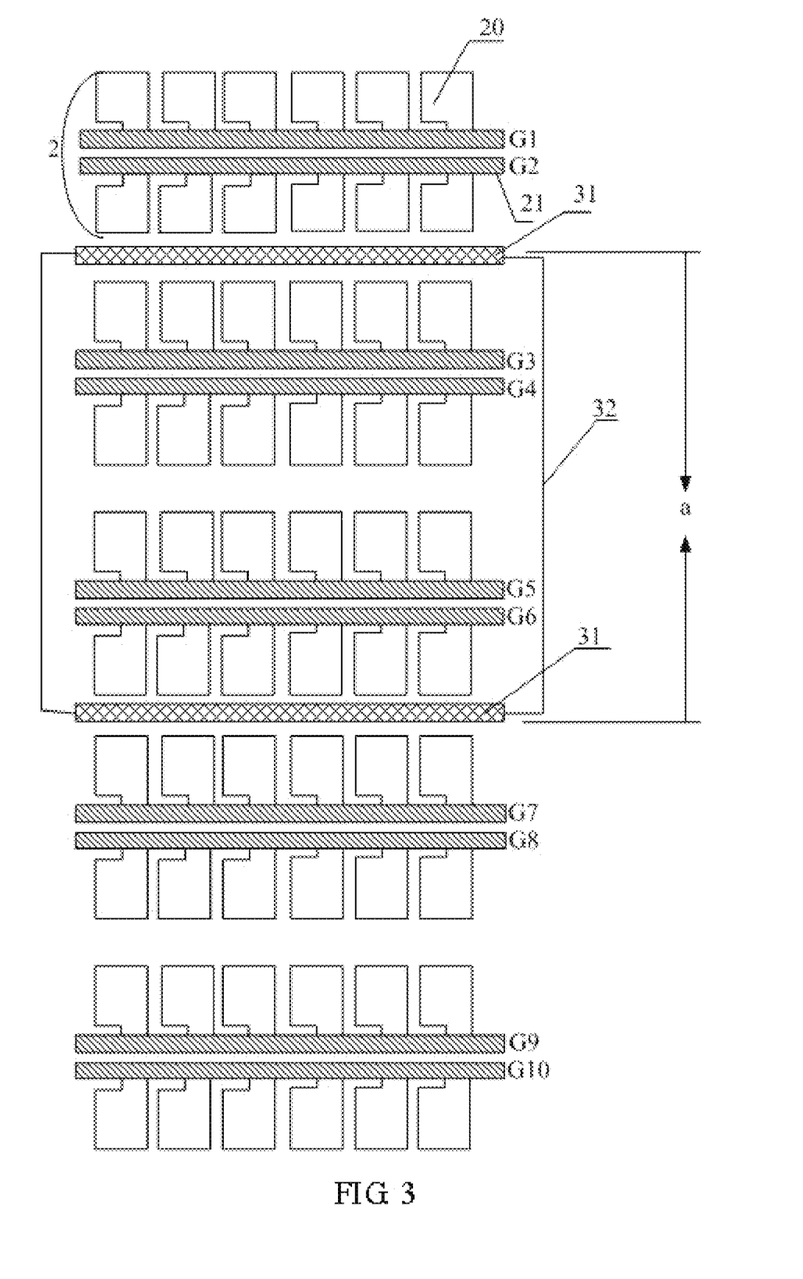
FIG. 3 is a view schematically illustrating a structure corresponding to a second arrangement of touch driving electrodes provided by an embodiment of the present invention.

The second way is illustrated as FIG. 3. Each of the touch driving electrodes 3 comprises at least two (namely a plurality of) touch driving sub-electrodes 31. Each of the touch driving sub-electrodes 31 is disposed between the adjacent two sub-pixel-unit groups 2. A plurality of the touch driving sub-electrodes 31 are connected with each other in a parallel connection and can be addressed collectively, for example, the parallel connection can be achieved by lead wires 32 in the periphery of the array substrate.

The longitudinal (namely the column direction) width of the touch driving electrode provided by the first way is smaller, and approximately in the order of micron. The longitudinal width of the touch driving electrode is larger, and approximately in the order of millimeter. The longitudinal width of the touch driving electrode is the longest distance from a first touch driving sub-electrode to a second touch driving sub-electrode. As illustrated in FIG. 3, the longitudinal width of the touch driving electrode is a.

For example, the longitudinal width of the touch driving electrode provided by the second way can be in a range from 2 mm to 6 mm, and the touch driving electrode 3 is formed by the parallel connection of a plurality of touch driving sub-electrodes 31.

The touch driving electrodes 3 provided by the embodiment can be disposed in a same layer as the gate lines 21, or in a different layer. In order to reduce the manufacturing process of touch panels, for example, the touch driving electrodes 3 can be disposed in a same layer as the gate lines 21. For example, the touch driving electrodes 3 and the gate lines 21 are completed in same one manufacturing process, and these two components can be formed with only one mask process, so the manufacturing costs of touch panels are greatly decreased.

With regard to the array substrate provided by the embodiment, the touch driving electrodes 3 (or touch driving sub-electrode 31) can be disposed between any adjacent two sub-pixel-unit groups 2, or the touch driving electrode 3 (or touch driving sub-electrode 31) can be disposed between some adjacent two sub-pixel-unit groups 2, and this can be determined according to the need of the actual touch control precision (usually smaller than the display precision or the resolution). In general, it is better to dispose the touch driving electrode 3 (or touch driving sub-electrode 31) between some adjacent two sub-pixel-unit groups 2. For example, in the array substrate illustrated in FIG. 1 or FIG. 2, one touch driving electrode 3 (or touch driving sub-electrode 31) is disposed every two sub-pixel-unit groups 3.

A region between two sub-pixel-unit groups 2 of the array substrate of the embodiment is non-display region (which region corresponds to a black matrix BM on an opposite substrate (for example, a color filer substrate)). The touch driving electrodes 3 of the embodiment are disposed in regions to which the black matrix corresponds, so that the aperture ratio of pixels and the light transmittance are not affected.

In the above-mentioned array substrate illustrated in FIG. 1 or FIG. 2, the touch sensing electrodes 4 and common electrodes on the array substrate are multiplexed, for example, in a display period, the touch sensing electrodes 4 cooperate with pixel electrodes of respective sub-pixel units 20 to form multi-dimensional electric fields that drive the liquid crystal to rotate. A pixel electrode in each of the sub-pixel units 20 can be a plate-like electrode or a slit-shaped electrode. The array substrate of the embodiment of the present invention can be an FFS type or an ADS type array substrate.

The touch sensing electrodes 4 can be disposed in various ways. For example, as illustrated in FIG. 2, the touch sensing electrodes 4 are adjacent to each other and arranged in parallel; in addition, the touch sensing electrodes 4 are separated mutually to insulate from each other. The width of the touch sensing electrode 4 is, for example, equal to the sum of the width of two of the sub-pixel units 20, but the embodiments are not limited thereto. Or, the touch sensing electrodes 4 can be disposed alternately with common electrodes that are not multiplexed as touch sensing electrodes, and the description therefor is made as bellow with reference to FIG. 5.

Figure 4:
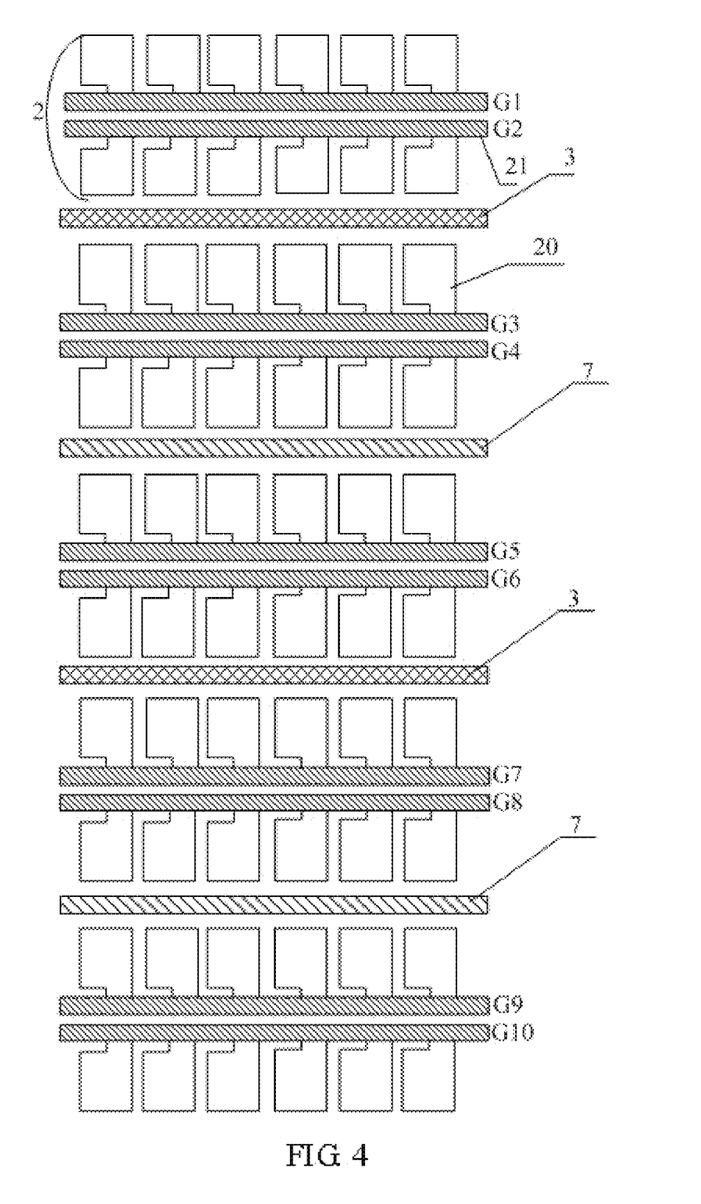
FIG. 4 is a view schematically illustrating a structure of an array substrate that comprises common electrode signal lines and is provided by an embodiment of the present invention.

FIG. 4 is a view schematically illustrating a structure of an array substrate of another embodiment of the present invention. The array substrate of this embodiment, compared with that of the embodiment illustrated in FIG. 1, is provided with a plurality of common electrode signal lines 7. For example, the common electrode signal lines 7 are arranged in the row direction of the sub-pixel units 20; the common electrode signal lines 7 are disposed between the adjacent touch driving electrodes 3, and between any adjacent two sub-pixel-unit groups 2. The common electrode signal lines 7 are connected with respective common sub-electrodes (namely the common electrodes) disposed above the pixel electrodes through via holes (not shown), so as to provide the common electrodes with an uniform and stable voltage signal (namely the $V_{com}$ voltage signal); but the common electrode signal lines 7 cannot be connected with common electrodes that are addressed separately and serve as the touch sensing electrodes.

The touch driving electrode 3 as illustrated in FIG. 4 comprises only one touch driving sub-electrode. For example, the common electrode signal lines 7 and the touch driving electrodes 3 are disposed alternately.

For example, as illustrated in FIG. 4, the touch driving electrodes 3, the common electrode signal lines 7 and the gate lines 21 can be disposed in a same layer, so the three components can be completed in a same manufacturing process, and therefore they can be formed with only one mask process, and this reduces the manufacturing costs of touch panels greatly.

It is to be noted that the touch driving electrodes 3 of the embodiment can also be used as the common electrode signal lines in an image display period (for example, connected with common electrodes that are not multiplexed as touch sensing electrodes), or the common electrode signal lines 7 can also be used as touch sensing electrodes in the touch control period (for example, connected with common electrodes that are multiplexed as touch sensing electrodes), and the two can be exchanged according to different cases. In this case, as for these two components, the $V_{com}$ voltage signal can be applied in the image display period, and a high frequency signal can be applied in the touch control period.

Figure 5:
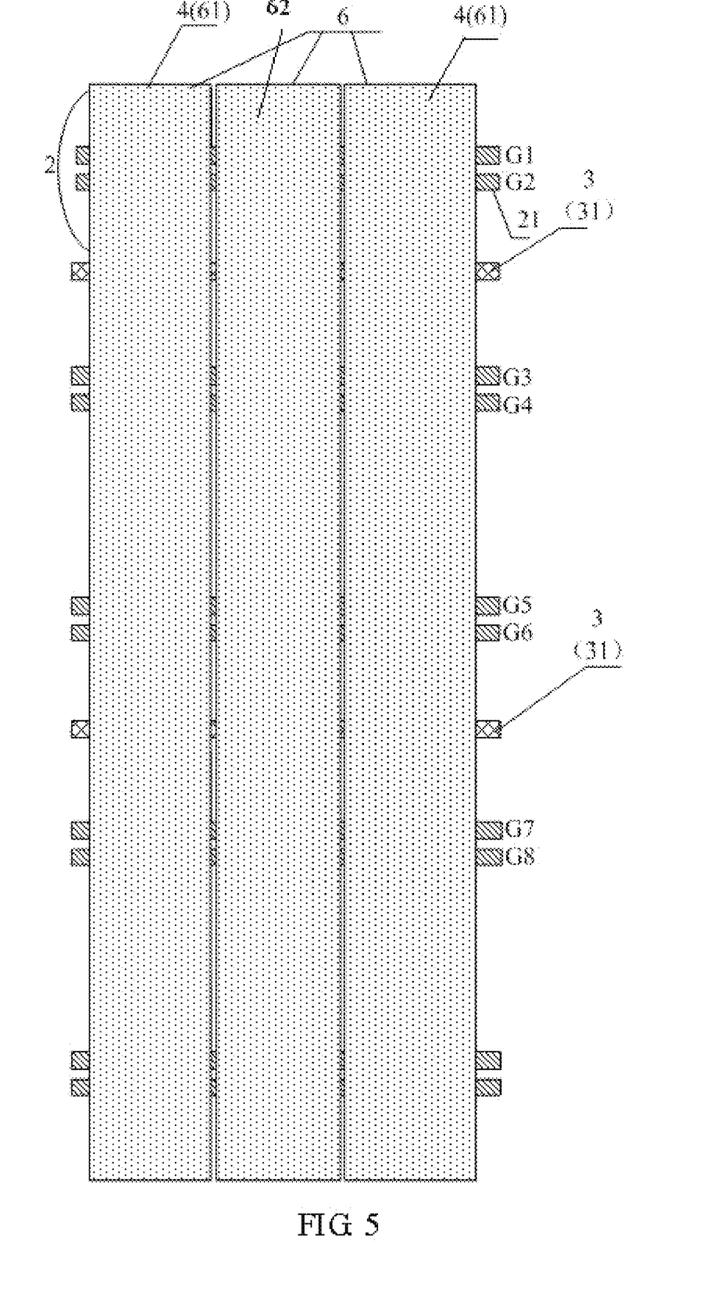
FIG. 5 is a view schematically illustrating a structure of an array substrate that comprises common sub-electrodes and is provided by an embodiment of the present invention.

As illustrated in FIG. 5, the array substrate provided by the embodiment of the present invention can further comprises: common electrodes 6 configured to achieve the image display in the image display period; and the common electrodes 6 comprise a plurality of first common sub-electrodes 61 and a plurality of second common sub-electrodes 62. For example, each of the common sub-electrodes 61 and each of the touch sensing electrodes 4 can be the same electrode. In other words, each of the touch sensing electrodes 4 can be used as a common sub-electrode in the image display period, while used for sensing a touch in the touch control period. The common sub-electrodes work together to form the common electrodes to which the common voltage can be applied. The second common sub-electrodes 62 are used as the common electrodes throughout the work period of the array substrate, and applied with the common voltage; for example, the second common sub-electrodes 62 can be connected with each other, for example, by the common electrode signal lines 7 as illustrated in FIG. 4, or by connection electrodes (not shown) in the peripheral region of the array substrate. In FIG. 5, the first common sub-electrodes 61 and the second common sub-electrodes 62 are disposed alternately, but the embodiment is not limited thereto. For example, according to the touch control precision, one of the first common sub-electrodes 61 can be disposed for every two of the second common sub-electrodes 62.

In the meantime, with regard to the case in which the first common sub-electrodes 61 and the second common sub-electrodes 62 are disposed alternately, similar to the touch driving electrodes 3, the first common sub-electrodes 61 can be disposed in two arrangements according to the touch control precision, for example, each of the first common sub-electrodes 61 can be addressed separately, or a plurality of (at least two of) the first common sub-electrodes 61 can be connected with each other in a parallel connection (for example, by means of the common electrode signal lines 7) and addressed collectively.

When the common electrodes 6 provided by the embodiment are disposed above the touch driving electrodes 3, in order to increase the work efficiency of liquid crystal molecules of the liquid crystal layer and to improve transmittance, for example, each of the common sub-electrodes 61 of the common electrodes 6 can be slit-shaped electrodes. In other words, the touch sensing electrodes 4 provided by the embodiment are silt-shaped electrodes with slits formed in a region to which each sub-pixel unit corresponds.

Figure 6:
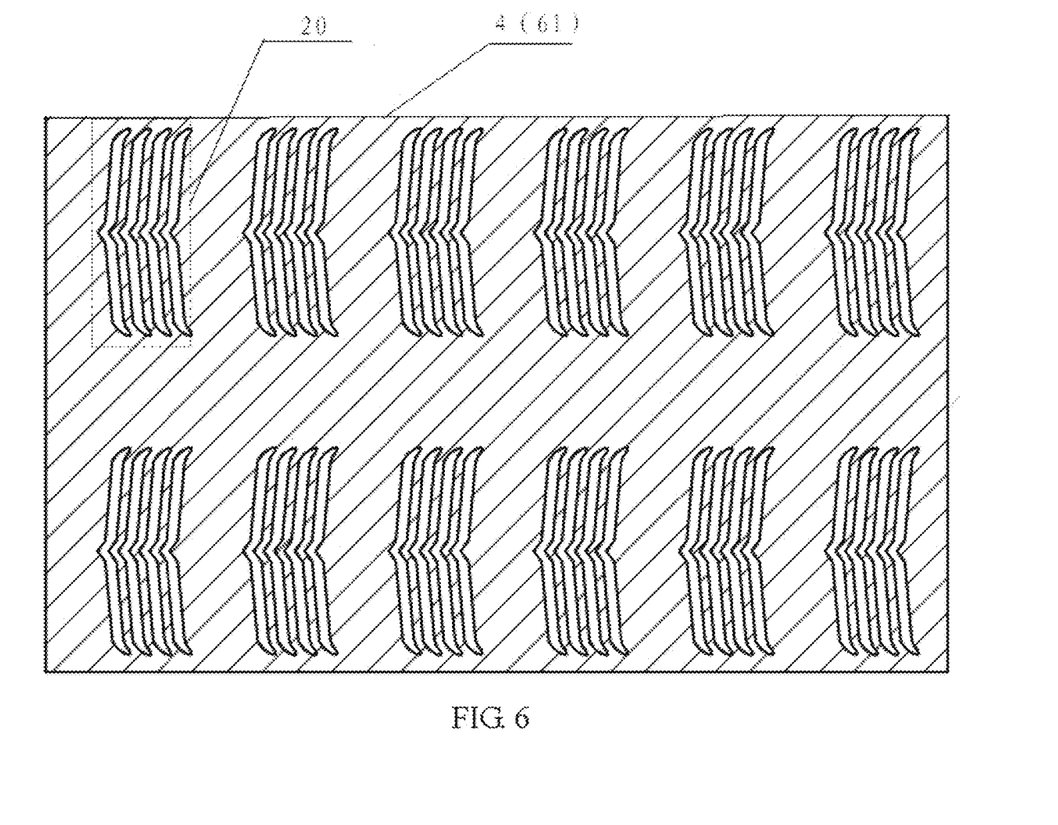
FIG. 6 is a view schematically illustrating a structure of slit-shaped common sub-electrodes in the array substrate of FIG. 5.

In order to describe the slit-shaped touch sensing electrodes 4 more clearly, FIG. 6 illustrates an enlarged schematic view of a structure of one touch sensing electrode 4. In FIG. 6, the region enclosed by a dashed box corresponds to a region where one of the sub-pixel units 20 is located.

It is to be noted that, in the embodiment, when the common electrodes comprise slit-shaped electrodes, the pixel electrodes can be plate-like electrodes, and this arrangement can achieve an image display of high quality. Pixel electrodes may also be slit-shaped electrodes.

Figure 7:
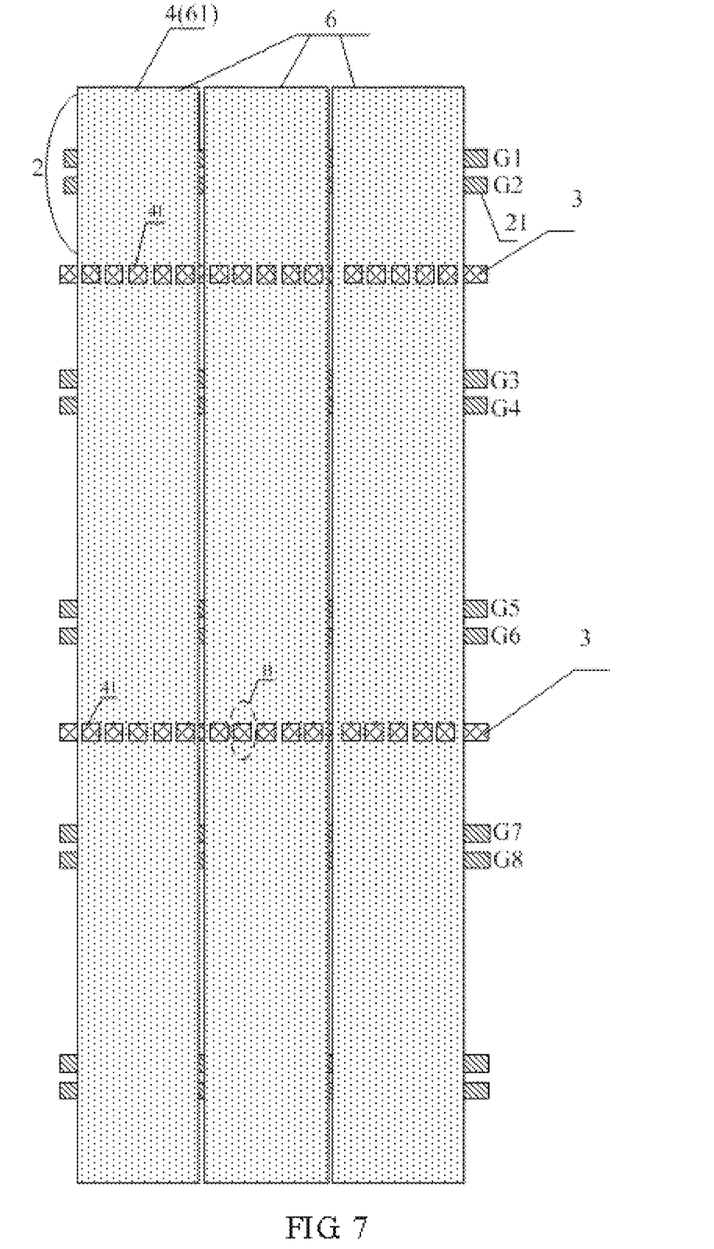
FIG. 7 illustrates the array substrate of FIG. 5 and with openings formed in the slit-shaped common sub-electrodes thereof.

For example, in order to guarantee that the projection electric field between the touch driving electrodes and the touch sensing electrodes extends to the surface of the touch panel and sensed by the person's finger to improve the touch control effect, as illustrated in FIG. 7, in the array substrate provided by a further embodiment of the present invention, each of the touch sensing electrodes 4 can be provided with a plurality of certain-sized openings disposed in the regions to which the touch driving electrodes 3 correspond, namely a plurality of openings with a predetermined size are disposed in regions where each of the touch sensing electrodes 4 overlaps the touch driving electrodes 3, so that electric field lines can pass therethrough, and then be touched by the operator's finger.

Figure 8:
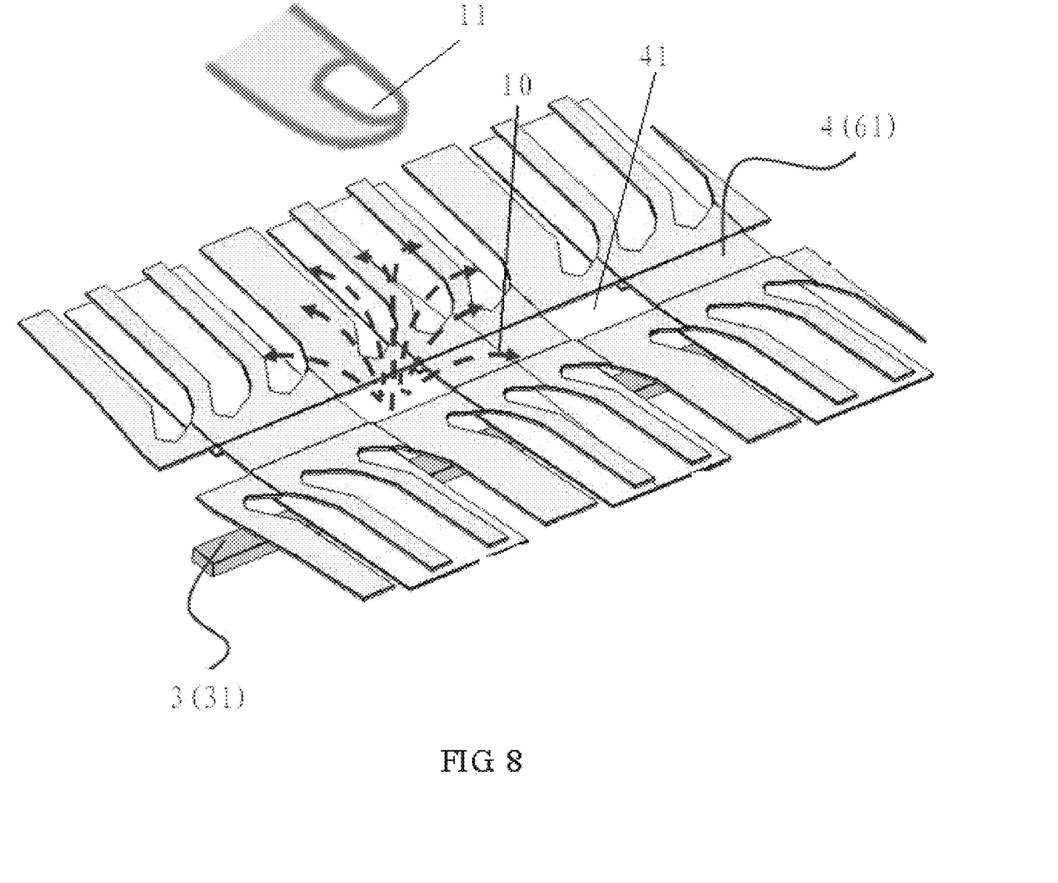
FIG. 8 is an enlarged stereo view schematically illustrating a structure of the region B in FIG. 7.

In order to describe the projection electric field more clearly, FIG. 8 is an enlarged stereo view schematically illustrating a structure of the region B in FIG. 7. Dotted lines 10 with arrows represent the electric field lines of the projection electric field, and the electric field lines from the touch driving electrodes 3(31) pass through the openings 41 of the touch sensing electrodes 4(61) and then are touched by the operator's finger 11 to increase the touch sensitivity, so the touch control effect is better.

Figure 9:
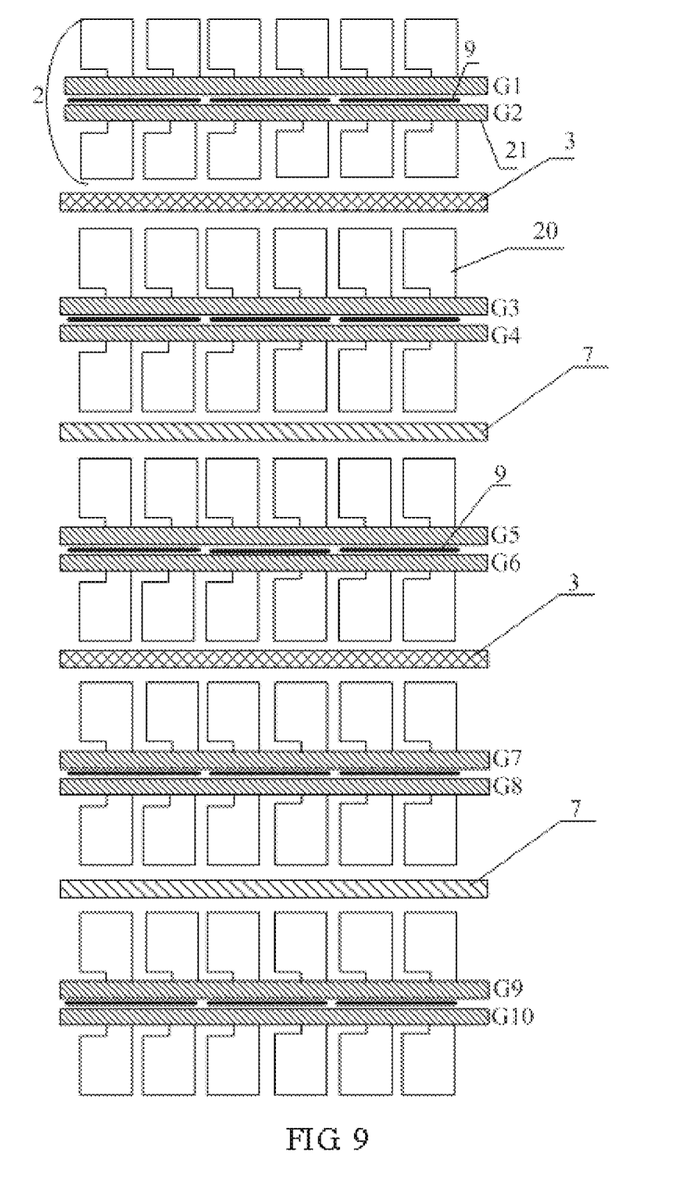
FIG. 9 illustrates an array substrate provided by an embodiment of the present invention and with metal lines disposed between gate lines thereof.

As illustrated in FIG. 9, the array substrate provided by another embodiment of the present invention, in addition to the above-mentioned structure, can further comprise metal lines 9 disposed between two of the gate lines 21 of each sub-pixel-unit group 2 and connected with each of the touch sensing electrodes 4. The metal lines 9 are arranged in the direction parallel to the gate lines 21, and the length thereof does not exceed the width of the touch sensing electrodes 4. The metal lines 9 can be used to reduce the resistance of the common sub-electrodes 61 that are connected therewith, because the resistivity of a metal line is much smaller than that of a metal oxide. But, the position of the metal lines 9 is not limited to the position between two adjacent gate lines 21. When the touch sensing electrodes 4 that are also used as the common electrodes are made from a transparent metal oxide, the resistance value of each touch sensing electrode 4 is relatively large and disadvantageous to the realization of better touch control effect. When each of the touch sensing electrodes 4 is connected with the metal lines 9 in a parallel connection, the resistance value of each touch sensing electrode 4 can be reduced greatly, and the touch control effect can be improved notably.

For example, the metal lines 9, the touch driving electrodes 3, the common electrode signal lines 7 and the gate lines 21 are disposed in a same layer. For example, the metal lines 9, the touch driving electrodes 3, the common electrode signal lines 7 and the gate lines 21 are completed in a same manufacturing process, and therefore, the four components can be formed with only one mask process, which greatly reduces the manufacturing costs of touch panels.

The in-cell touch panel provided by an embodiment of the present invention comprises any one of the above-mentioned array substrate; the array substrate simultaneously integrates touch driving electrodes and touch sensing electrodes, and a driving IC of the touch driving electrodes and a sensing IC of the touch sensing electrodes can be integrated within a same IC chip, so the structure of the entire in-cell touch panel is simple. In the embodiment of the present invention, common electrodes are used as the touch sensing electrodes, the touch driving electrodes and gate lines are disposed in a same layer, so no additional function film layers are added, the structure of the in-cell touch panel is further simplified, and the competitiveness of products is further improved.

Figure 10:
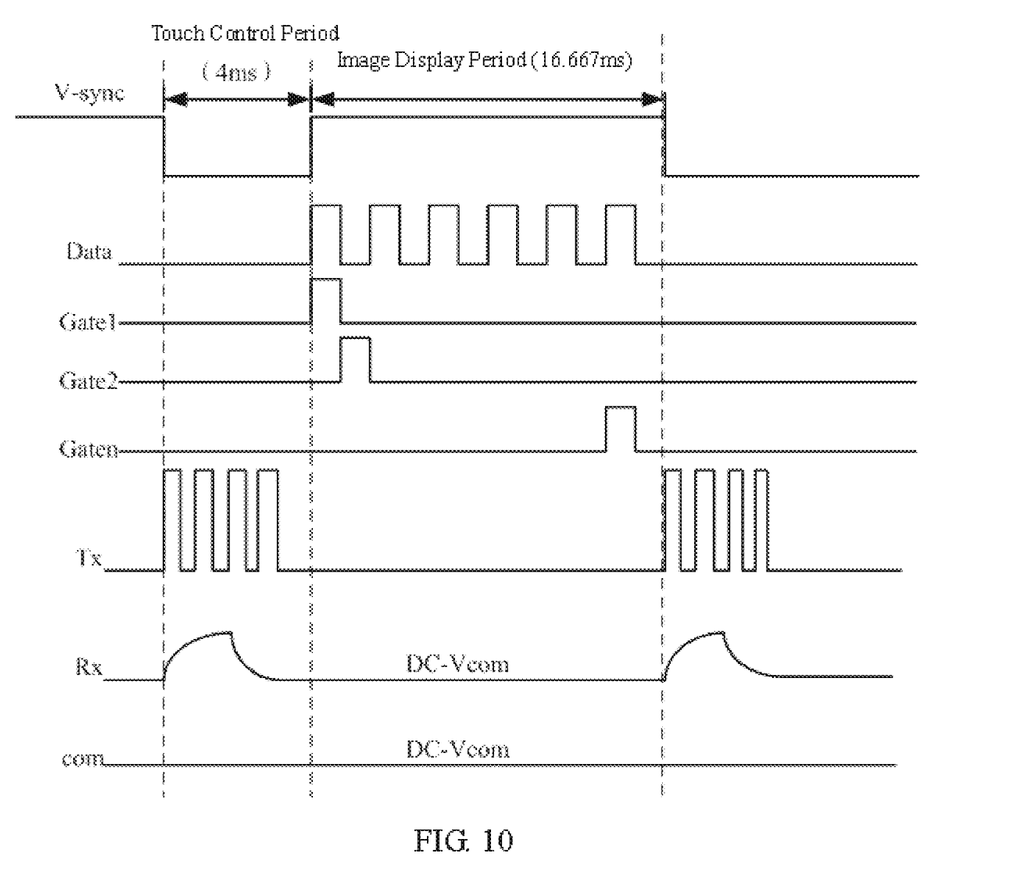
FIG. 10 is a timing chart illustrating how an in-cell touch panel provided by an embodiment of the present invention achieves the touch control function.

With reference to the timing chart that illustrates how the functions of image display and touch are achieved in FIG. 10, the work principle of, for example, the in-cell touch panel provided by the embodiment of the present invention and illustrated in FIG. 1, is described in detail.

In FIG. 10, the V-sync stands for a timing signal. FIG. 10 comprises the timing of gate lines (Gate), the number of which is n, the timing of a data line (Data), the timing of a touch driving electrode (Tx), the timing of a touch sensing electrode (Rx), and the timing of a common electrode signal line (Com). The gate lines, the number of which is n, comprise sequentially gate line 1, gate line 2, . . . , gate line n−1, gate line n (Gate1 . . . Gate n).

As illustrated in FIG. 10, the time period for the in-cell touch panel to display a frame is 16.67 ms, 4 ms of which are elected to serve as a touch control period, and the rest 12.67 ms of which are used as an image display period.

In the touch control period, the data lines (Data) and the gate lines that are n in number are in a low-level, standing-by state without affecting the touch process. The touch driving electrodes Tx and the touch sensing electrodes Rx are in a working state to realize the touch function.

In the image display period, the touch driving electrodes Tx and the touch sensing electrodes Rx are in a low-level, standing-by state (disconnected with a corresponding voltage source) to avoid affecting the image display. The gate lines that are n in number and the data line are in a high-level, working state, and can realize the image display.

The common electrode signal lines (Com) maintains a constant-voltage state (DC-Vcom) without affecting the touch control effect in the touch control period, and transmits the Vcom signals to the common electrodes in the image display period.

The above-mentioned 12.67 ms of the image display period and the 4 ms of the touch display period are only an example for describing the present invention, for example, the time period of the image display period is not limited to 12.67 ms, and the time period of the touch display period is not limited to 4 ms.

An embodiment of the present invention further provides a display device, and the display device comprises the above-mentioned in-cell touch panel and can be a liquid crystal display, a liquid crystal television or the like.

In the display device, an array substrate and an opposite substrate are disposed opposite to form a liquid crystal cell, and a liquid crystal material fills the liquid crystal cell. The opposite substrate can be, for example, a color filter substrate, and a black matrix and, for example, red-green-blue (RGB) sub-pixel units are formed on the opposite substrate. In some examples, the display device further comprises a backlight that provides back light for the array substrate.

From the above, on the array substrate of the in-cell touch panel provided by embodiments of the present invention, touch driving electrodes and touch sensing electrodes that achieve the touch function are integrated, which can reduce the thickness of the entire in-cell touch panel on one hand, and help to integrate a driving IC for the touch driving electrodes and a sensing IC for the touch sensing electrodes within a same IC chip on the other hand, so the difficulty in matching the IC chips is decreased notably, the structure of the in-cell touch panel is simplified, and the competitiveness of products is improved. In addition, when the touch sensing electrodes are multiplexed with the common electrodes that are provided in the array substrate and used for realizing the image display, the common electrodes are divided into a plurality of strip-like common sub-electrodes, and the common sub-electrodes are in a time-sharing driving mode to realize the touch control and display functions, thus with regard to the structure of the touch panel, no additional function film layers are added, the structure of the in-cell touch panel is further simplified, and manufacturing costs of products is reduced. The touch sensing electrodes and gate lines are disposed in a same layer, so the structure is simple and the manufacturing process become easy.

What are described above is related to the illustrative embodiments of the disclosure only and not limitative to the scope of the disclosure; the scopes of the disclosure are defined by the accompanying claims.

The invention claimed is:

1. An array substrate, comprising:
a plurality of sub-pixel units arranged in an array comprising a plurality of rows of the sub-pixel units, the plurality of rows of the sub-pixel units divided into a plurality of sub-pixel-unit groups, wherein each of the sub-pixel-unit groups comprises, a first row of the sub-pixel units and a second row of the sub-pixel units, and no other sub-pixel units is between the first row of the sub-pixel units and the second row of the sub-pixel units, and two gate lines are disposed between the first row of the sub-pixel units and the second row of the sub-pixel units, and one of the gate lines closed to the first row of the sub-pixel units is connected to all the sub-pixel units of the first row of the sub-pixel units, and the other one of the gate lines closed to the second row of the sub-pixel units is connected to all the sub-pixel units of the second row of the sub-pixel units;
a plurality of touch driving electrodes, disposed between the sub-pixel-unit groups that are provided on the array substrate, and arranged in a row direction of the sub-pixel units;
a plurality of touch sensing electrodes, disposed on the array substrate, arranged in a column direction of the sub-pixel units, and insulated from the touch driving electrodes and the two gate lines,
the array substrate further comprises a plurality of metal lines disposed between each of the touch sensing electrodes and the array substrate, and connected in parallel with the touch sensing electrodes, and the metal lines are arranged in a direction parallel to the gate lines, the metal lines are disposed in a same layer as the gate lines and between the two gate lines, and the metal lines between the two gate lines are disposed in a same line and spaced apart, and the metal lines are spaced apart from the two gate lines, and a length of the metal lines does not exceed a width of the touch sensing electrodes.

2. The array substrate as claimed in claim 1, wherein the touch sensing electrodes are disposed above the touch driving electrodes, and the touch sensing electrodes act as common sub-electrodes that form common electrodes in a touch control period.

3. The array substrate as claimed in claim 2, further comprising common electrode signal lines each disposed between two of the adjacent sub-pixel-unit groups, arranged in a row direction of the sub-pixel units, and connected with respective common sub-electrodes by via holes.

4. The array substrate as claimed in claim 3, wherein the gate lines, the metal lines, the common electrode signal lines and the touch driving electrodes are disposed in a same layer.

5. The array substrate as claimed in claim 4, wherein the touch driving electrodes and the common electrode signal lines are disposed alternately.

6. The array substrate as claimed in claim 4, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

7. The array substrate as claimed in claim 3, wherein the touch driving electrodes and the common electrode signal lines are disposed alternately.

8. The array substrate as claimed in claim 3, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

9. The array substrate as claimed in claim 1, wherein a plurality of openings with a predetermined size is formed in regions where each of the touch sensing electrodes overlaps the touch driving electrodes.

10. The array substrate as claimed in claim 9, further comprising metal lines disposed below each of the touch sensing electrodes and connected with the touch sensing electrodes by via holes.

11. The array substrate as claimed in claim 9, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

12. The array substrate as claimed in claim 2, wherein a plurality of openings with a predetermined size is formed in regions where each of the touch sensing electrodes overlaps the touch driving electrodes.

13. The array substrate as claimed in claim 2, further comprising metal lines disposed below each of the touch sensing electrodes and connected with the touch sensing electrodes by via holes.

14. The array substrate as claimed in claim 2, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

15. The array substrate as claimed in claim 1, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

16. A display device, comprising the in-cell touch panel as claimed in claim 1.

17. The array substrate as claimed in claim 1, wherein the touch driving electrodes comprises a plurality of touch driving sub-electrodes that are arranged in a row direction, the touch driving sub-electrodes are each disposed between adjacent two of the sub-pixel-unit groups, and the touch driving sub-electrodes are connected with each other in a parallel connection.

* * * * *